Dec. 18, 1923.  
P. GUNDLACH  
1,478,116  
KNEADING MACHINE SPECIALLY FOR DRY AND SLIMY MASSES  
Filed Oct. 2, 1922
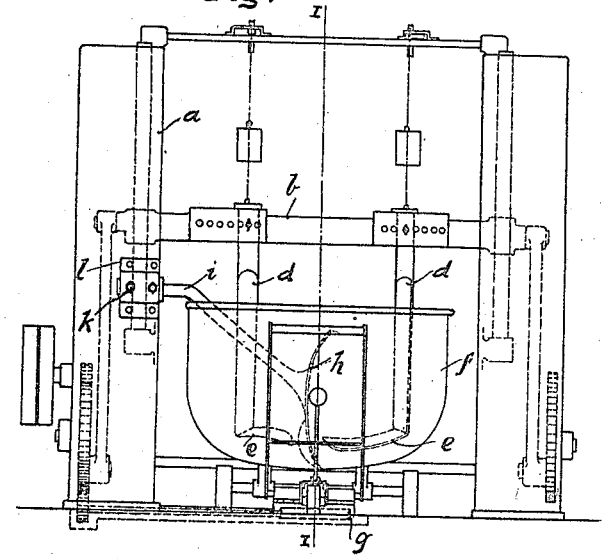
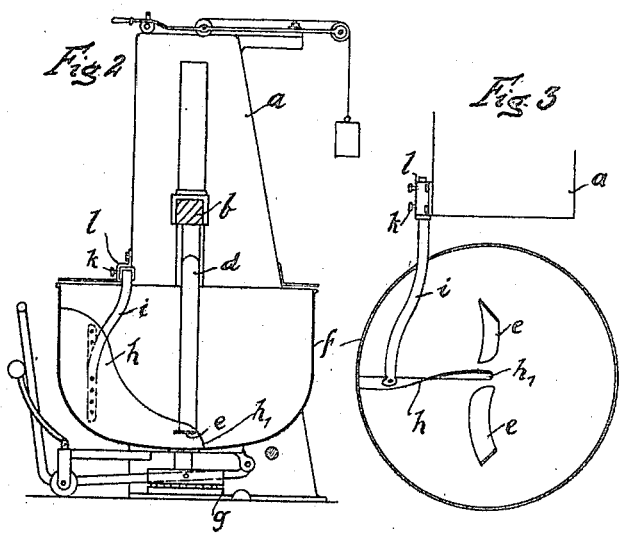
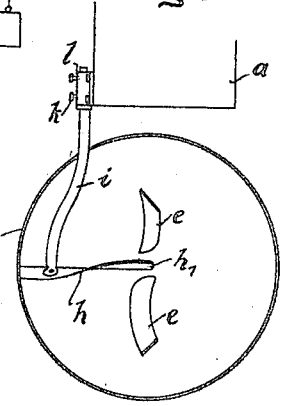
Witnesses:
Inventor:  
Paul Gundlach Patented Dec. 18, 1923.

1,478,116

UNITED STATES PATENT OFFICE.

PAUL GUNDLACH, OF BREMEN, GERMANY.

KNEADING MACHINE SPECIALLY FOR DRY AND SLIMY MASSES.

Application filed October 2, 1922. Serial No. 591,832.

*To all whom it may concern:*

Be it known that I, PAUL GUNDLACH, a citizen of the German Republic, residing at Bremen, Germany, have invented certain new and useful Improvements in Kneading Machines Specially for Dry and Slimy Masses (for which an application for patent has been filed in Germany on the 21st of April, 1922), of which the following is a specification.

This invention relates to a kneading machine, specially for dry and liquid masses, for instance dry colouring matter or colouring matter to be mixed. Colouring matter must be well mixed and kneaded in the dry state and during the stirring a very thorough agitating is also required.

The kneading machines which have hitherto been used for this purpose do not permit of a perfect kneading of colouring matter as there remain always grains which have not been treated and kneaded and an intimate mixing is not produced.

According to this invention such a perfect working and kneading is ensured as has hitherto never been possible with any kneading machine of known construction.

The invention consists in that in the rotating tub a stationary plate of the shape of a plough share is arranged which lifts the material advancing with the rotating tub, turns the material over and pushes the same towards the center of the tub. A further improvement is that the turning plate in the shape of a plough share co-operates with two kneaders working in vertical direction in proximity of the center of the tub. The turning plate is in contact with the bottom of the tub and with the side wall of the same and it is constructed like a scraper. The turning plate is removably mounted upon the frame of the machine so that it can be withdrawn from the tub.

The invention can be carried out in various manners. A preferred form of construction is shown by way of example in the accompanying drawing, wherein:

Fig. 1 shows the improved kneading machine in front elevation.

Fig. 2 is a section on line I—I of Fig. 1.

Fig. 3 is a plan view of Fig. 2.

The kneading machine consists in the well known manner of the machine frame $a$ and of a frame $b$ which is adjustable in vertical direction and has kneading arms $d$ with blades $e$. The kneading arms $d$ can be operated in the well known manner.

According to the invention a stationary turning plate $h$ is arranged in the rotatable tub $f$ which is transportable and adapted to be rotated by a transmission gear $g$. This turning plate $h$ has the shape of a plough share and it is arranged so that it extends between the two kneading blades $e$ and acts as scraper as it is in contact with the bottom and with the side wall of the tub.

The turning plate $h$ projects with its pointed end $h'$ between the kneading arms and extends beyond the center of the tub.

When the tub is rotating the mass to be treated is conducted towards the turning plate. The mass in scraped by the turning plate off the bottom and the side wall, turned over and pushed towards the center of the tub so that it can be treated by the kneading arms which are adapted to be operated during the rotation of the tub.

The turning plate $h$ is supported by an arm $i$ which is removably fixed by means of a screw $k$ in a guide $l$ of the machine frame $a$. The turning plate which acts like a plough share can therefore be removed from the tub before the same is carted off. The turning plate $h$ can be easily cleaned if it is to be used for other colouring matter. The turning plate $h$ can be adjustably mounted upon the arm $i$ or this arm $i$ can be mounted upon the machine frame so that it can be adjusted in lateral direction.

The curvature of the turning plate $h$ is more or less pronounced according to whether the material has only to be lifted or to be pushed towards the center of the tub.

I claim:—

1. In a device of the class described, a rotatable tub to contain a mass of material to be treated, a therein contained stationary turning plate similar to a plough share having a vertical portion extending to near the top of the tub and an angularly arranged portion extending beyond the centre of the bottom of the tub and terminating in a pointed end to respectively contact the side and bottom portions of the tub to simultaneously scrape the same whereby the mass conducted toward it by the rotation of the tub is lifted, turned over, and pushed toward the centre of the tub, and two kneaders arranged in proximity to the centre of the tub to co-operate with said stationary turning plate to knead the said centralized mass, the kneaders being respectively of convex and concave formation.

2. In a device of the class described, a rotatable tub to contain a mass of material to be treated, a therein contained stationary turning plate similar to a plough share having a vertical portion extending to near the top of the tub and an angularly arranged portion extending beyond the centre of the bottom of the tub and terminating in a pointed end to respectively contact the side and bottom portions of the tub to simultaneously scrape the same whereby the mass conducted toward it by the rotation of the tub is lifted, turned over, and pushed toward the centre of the said tub in combination with two vertically operating kneaders arranged in alignment on opposite sides of the said stationary turning plate to knead the said centralized mass.

3. In a device of the class described, a rotatable tub to contain a mass of material to be treated, a therein contained stationary turning plate similar to a plough share having a vertical portion extending to near the top of the tub and an angularly arranged portion extending beyond the centre of the bottom of the tub and terminating in a pointed end to respectively contact the side and bottom portions of the tub to simultaneously scrape the same whereby the mass conducted toward it by the rotation of the tub is lifted, turned over, and pushed toward the centre of the said tub, in combination with two vertically operating kneaders arranged on opposite sides of the said stationary turning plate to knead the said centralized mass, the kneaders being operated during the rotation of the tub, and lying substantially at right angles to the end of the said turning plate.

In testimony whereof I affix my signature in presence of two witnesses.

PAUL GUNDLACH.

Witnesses:
FRANCIS J. DUGAN,
F. BRUENING.